(12) United States Patent
Ekner et al.

(10) Patent No.: US 9,794,388 B2
(45) Date of Patent: *Oct. 17, 2017

(54) HEADSET SYSTEM FOR TRANSFERRING CALL BETWEEN TWO TELECOMMUNICATION DEVICES

(71) Applicant: GN Netcom A/S, Ballerup (DK)

(72) Inventors: Bjørn Ekner, Frederiksberg (DK); Lisa Roerbaek Kamstrup, Copenhagen (DK); Carsten Dahl Hjarup, Broenshoej (DK); Brian Koefoed, Glostrup (DK)

(73) Assignee: GN Netcom A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,550

(22) Filed: Mar. 1, 2017

(65) Prior Publication Data

US 2017/0180528 A1    Jun. 22, 2017

Related U.S. Application Data

(63) Continuation of application No. 14/995,422, filed as application No. PCT/EP2013/064930 on Jul. 15, 2013, now Pat. No. 9,591,116.

(51) Int. Cl.
*H04M 1/60* (2006.01)
*H04M 1/253* (2006.01)
(Continued)

(52) U.S. Cl.
CPC ....... *H04M 1/6066* (2013.01); *H04M 1/2473* (2013.01); *H04M 1/2535* (2013.01); *H04M 3/58* (2013.01)

(58) Field of Classification Search
CPC .. H04M 1/606; H04M 1/2474; H04M 1/2535; H04M 1/6058
See application file for complete search history.

(56) References Cited

U.S. PATENT DOCUMENTS 6,330,325 B1 * 12/2001 Reid ................ H04M 3/51
                                                        379/214.01
6,845,408 B1   1/2005 Lemke et al.
(Continued)

FOREIGN PATENT DOCUMENTS

WO    WO 2013/098263    7/2013

OTHER PUBLICATIONS

International Search Report for International application No. PCT/EP2013/064930 dated Feb. 3, 2014.

*Primary Examiner* — Tuan Pham
(74) *Attorney, Agent, or Firm* — Altera Law Group, LLC

(57) ABSTRACT

A headset system (1) comprising a first telecommunication device (3) comprising a desk phone or a computer (4) with an installed softphone, a second telecommunication device, such as a mobile phone or a smart phone (6), and a headset (2) comprising a cord (5) with a first connector (7), by means of which the headset (2) is adapted to be interchangeably connected to the first telecommunication device (3) and the second telecommunication device (6). The headset system (1) is adapted to transfer a call from the first telecommunication device (3) to the second telecommunication device (6), when the first connector (7) is unplugged from the first telecommunication device (3). The invention also relates to An external device (8) comprising a second connector (31) to be attached to a first connector (7) of a headset (2), means (9, 10) for connecting the external device (8) to a personal computer (4) with a softphone installed on it, a controller (36) adapted to send a call transfer control signal to the softphone, when the first connector (7) is unplugged from the second connector (31), whereby an active call on the first telecommunication device (4) is transferred to a second telecommunication device (6).

18 Claims, 5 Drawing Sheets

(51) Int. Cl.
  *H04M 1/247* (2006.01)
  *H04M 3/58* (2006.01)

(56) References Cited

U.S. PATENT DOCUMENTS

| | | | |
|---|---|---|---|
| 8,209,441 B1 * | 6/2012 | Brockway | G06F 3/162 |
| | | | 379/32.01 |
| 9,591,116 B2 * | 3/2017 | Ekner | H04M 1/2473 |
| 2007/0091833 A1 | 4/2007 | Bauchot et al. | |
| 2011/0207447 A1 | 8/2011 | Bhow | |

* cited by examiner

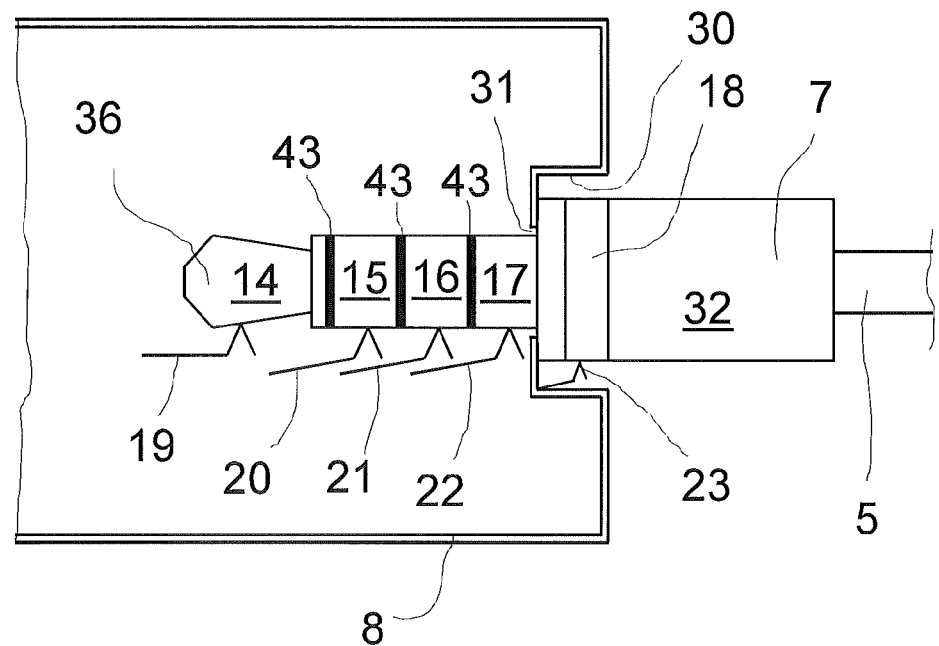
Fig. 4
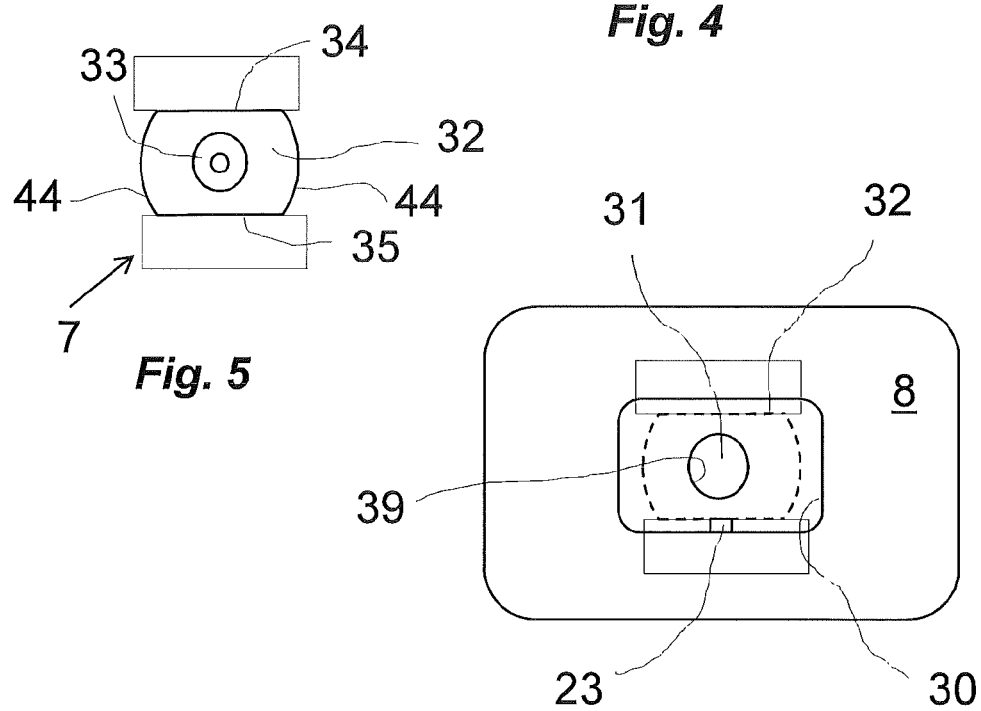
Fig. 5
Fig. 6

HEADSET SYSTEM FOR TRANSFERRING CALL BETWEEN TWO TELECOMMUNICATION DEVICES

TECHNICAL FIELD

The disclosure relates to a headset system comprising
a first telecommunication device comprising a desk phone or a computer with an installed softphone,
a second telecommunication device, such as a mobile phone or a smart phone,
a headset comprising a cord with a first connector, by means of which the headset is adapted to be interchangeably connected to the first telecommunication device and the second telecommunication device.

The disclosure also relates to an external device comprising
a second connector to be attached to a first connector of a headset,
means for connecting the external device to a personal computer with a softphone installed on it,
a controller adapted to send a call transfer control signal to the softphone, when the first connector is unplugged from the second connector, whereby an active call on the first telecommunication device is transferred to a second telecommunication device.

BACKGROUND ART

Today, many people all over the world use several different telecommunication devices such as PSTN desktop phones, IP desktop phones, PC softphones and smart phones etc. Especially smart phones and IP telephony (IP desk phones and PC softphones) have become popular the recent years. Smart phones and mobile phones are advantageous as the user can move around while having a conversation with other call participants. PSTN and IP telephony is advantageous as it often provides telephony at low rates and good audio quality. When a user is in a call on the PSTN or IP telephone and must leave his desk, maybe for driving home or to a meeting, he must end the call, and continue it on the mobile phone. This is cumbersome and time consuming. He may be able to transfer the call, but this requires manual interaction.

US 2011/0207447 (Plantronics Inc) discloses a headset system, which makes it possible for a user to seamlessly transfer a call from a first telecommunication device to a second telecommunication device by entering a call transition mode of the headset.

DISCLOSURE OF INVENTION

The object of the invention is to provide a headset system with an improved way of transferring telephone calls from a first telecommunication device to a second telecommunication device. The headset system according to the invention is characterized in that it is adapted to transfer a call from the first telecommunication device to the second telecommunication device, when the first connector is disconnected or unplugged from the first telecommunication device. If a user is using his headset for a telephone call on a PC softphone as the first telecommunication device and wants to leaves the desk, he may simply unplug the headset cord, whereby the call is automatically transferred to his mobile phone. He may then continue his conversation while he is leaving his desk. He may even plug the headset into his smart phone and using the headset on his mobile phone also. The smartphone may also be adapted to transfer a call to the PC softphone, when the headset is unplugged from the smart phone.

The first telecommunication device may comprise a main device, such as a desktop computer, a laptop computer or a tablet computer, on which a softphone is installed.

The main device may comprise a headset port or serial port, and the softphone may be adapted to transfer a call to the second telecommunication device, when the first connector is unplugged from the headset port or serial port.

The headset port may be a standard 3.5 mm 4-conductor TRRS (tip/ring/ring/sleeve) socket with left audio on the tip, right audio on the first ring, ground on the second ring and microphone on the sleeve. This standard is used by Apple, HTC, latest Nokia, latest Samsung, latest Sony (2012+) and most Android phones.

If a serial port is used, it may be a USB or micro-USB port.

A softphone plug-in for performing a call transfer to a pre-programmed number of the second telecommunication device may be installed on the main device, eventually using a software API on the main device.

The first telecommunication device may comprise an external device, which is connected to the main device, wherein the external device comprises a second connector adapted to be connected to the first connector.

The external device may comprise a third connector, by means of which it is connected to a port of the main device.

The external device may comprise a controller, which is adapted to send a call transfer control signal to the softphone, when the first connector is disconnected or unplugged from the second connector.

The external device may comprise a user interface, by means of which a user can control the first telecommunication device. Thus, the external device may comprise a button for accepting and ending calls, a button for muting the microphone and buttons or a knob or wheel for adjusting the headset volume.

The port of the main device may be a digital port, such as a USB port, and the external device may comprise a digital-to-analog converter and an analog-to-digital converter.

According to an embodiment, the second connector comprises a standard 2.5 mm or 3.5 mm 4-conductor TRRS socket, which TRRS socket comprises a left audio contact pin, a right audio contact pin, a ground contact pin and a microphone contact pin, and wherein the first connector comprises a corresponding 2.5 mm or 3.5 mm 4-conductor TRRS plug, which TRRS plug comprises a connector sleeve and a connector rod, which connector rod comprises a left audio contact area, a right audio contact area, a ground contact area and a microphone contact area.

According to an embodiment, the headset comprises power consuming electronics, wherein the connector sleeve comprises a power supply contact area for supplying power to the headset, and wherein the second connector comprises a power supply contact pin, which contacts the power supply contact area, when the TRRS plug of the first connector is plugged into the TRRS socket of the second connector.

The invention also relates to an external device comprising
a second connector to be attached to a first connector of a headset,
means for connecting the external device to a personal computer with a softphone installed on it,
a controller adapted to send a call transfer control signal to the softphone, when the first connector is unplugged from the second connector, whereby an active call on the first telecommunication device is transferred to a second telecommunication device.

BRIEF DESCRIPTION OF THE DRAWINGS

The invention is explained in detail below with reference to the drawing illustrating a preferred embodiment of the invention and in which FIG. 5 is an end view of the first connector, FIG. 6 is an end view of the external device.

MODES FOR CARRYING OUT THE INVENTION

Figure 1:
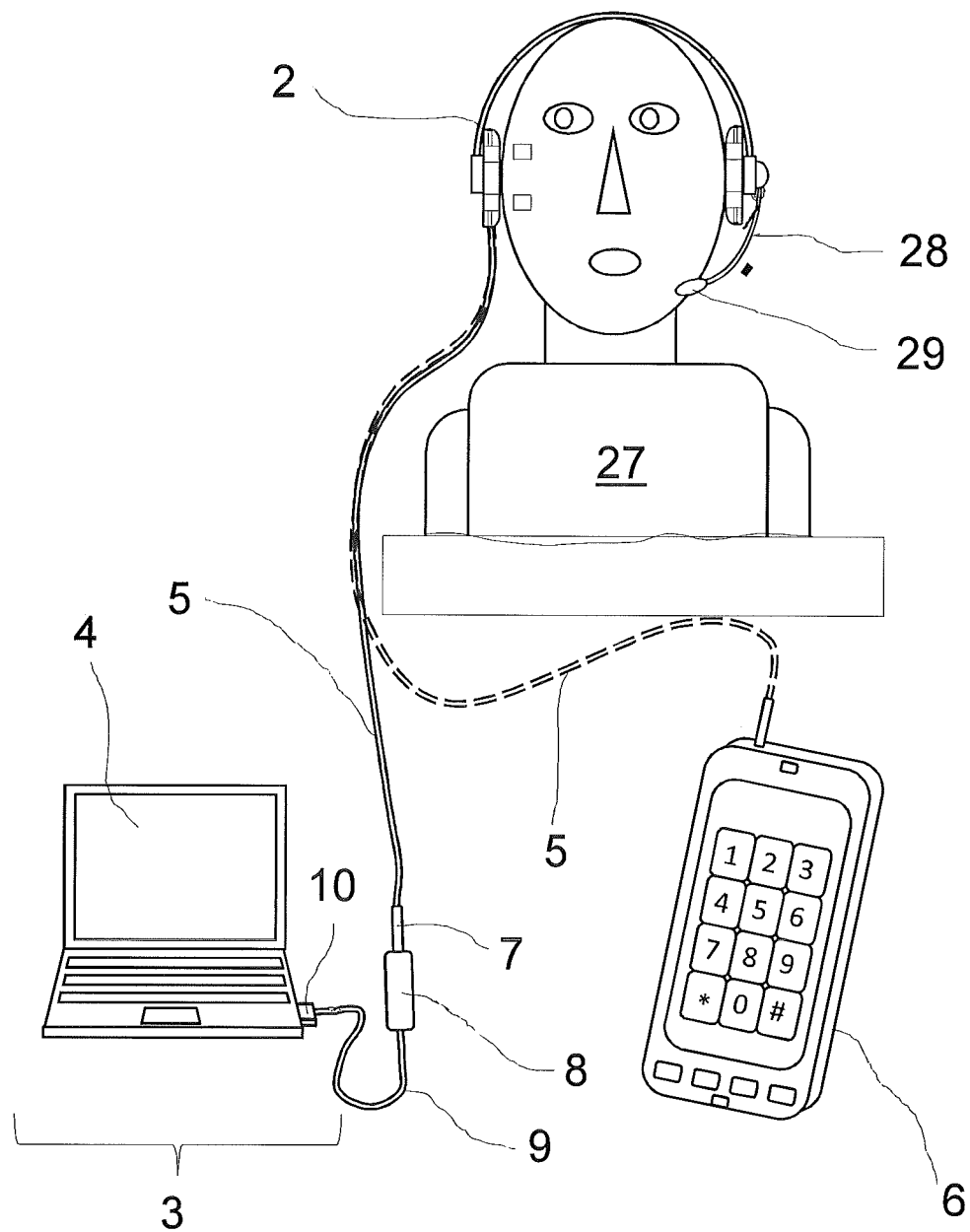
FIG. 1 is a schematic view of a headset system according to a first embodiment comprising a headset, a laptop computer, an external device and a smart phone.

FIG. 1 is a schematic view of a headset system 1 according to the invention. The headset system 1 comprises a headset 2, a first telecommunication device 3 consisting of a laptop computer 4 and an external device 8, and a second telecommunication device consisting of a smart phone 6. The headset 2 is a duo headset comprising two earphones, a headband and a microphone arm 28 with a microphone 29. The headset 2 is worn by a user 27, so that the earphones are arranged on his ears and the microphone close to his mouth. The headset 2 comprises an ANC (active noise cancelling) circuit requiring electrical power, which will be explained later. The external device 8 is by a USB cable 9 with a USB plug 10 connected to a USB port of the laptop computer 4. The headset 2 comprises a headset cord 5 with a first connector 7, which is plugged in to a second connector of the external device 8.

The headset system 1 can be utilized by the following scenarios:

Scenario 1—The user is leaving his desk during a softphone call:

The user is sitting at his desk with the smart phone 6 lying in his pocket. He makes a call on the softphone (on the laptop computer 4) using his headset 2. During the call, he realises that he must leave the office for a meeting in another building. He informs the other participant of the telephone conversation, that there will be a short break. Then he pulls the first connector 7 out of the external device 8 and plug it into the headset socket of his smart phone 6. As a result of unplugging the first connector 7 from the external device 8, the latter sends a control signal to the laptop computer 4 instructing the softphone to transfer the call to the smart phone 6. A software plugin installed on the laptop computer 3 "knows" the number of the smart phone 6 and initiates a call transfer to the smart phone 6. A voice message, such as "please wait for reconnection" is sent to the other call participant. The headset 2 is programmed to recognize the incoming call (the transferred call) from the softphone and automatically accepts the incoming call on the smart phone, whereby the conversation can continue while the user is walking to the other building. The headset system 1 according to FIG. 1 is also advantageous although the headset 2 is not connected to the smart phone 6. In this case, the user must continue the call on the smart phone 6 without using the headset 2. In this case, the smart phone 6 may be programmed to automatically accept the incoming call (the transferred call) from the softphone or the user may manually accept the call, as he does when there is a normal incoming call on the smart phone 6.

Scenario 2—The user is arriving at his desk during a mobile call:

The user is driving his car back to the job from a meeting with his smart phone 6 in his pocket and the headset 2 on his head. While driving he accepts an incoming call on the smart phone by pushing a button on the headset 2. He arrives at his work while talking to the call participant. He enters the office building and approaches his desk. When he arrives at his desk, he powers on the computer 4. When the softphone on the laptop computer 4 is ready, the user may unplug the headset from the smart phone 6. The smart phone 6, which has a special app installed, will automatically transfer the call to the softphone. The softphone plugin recognises the smart phone number and automatically accepts the incoming call (the transferred call), when the first connector 7 is plugged into the external device 8, whereby the smart phone call terminates and the softphone call is started.

The system 1 shown in FIG. 1 may also allow the user to manually activating a call transfer.

Figure 2:
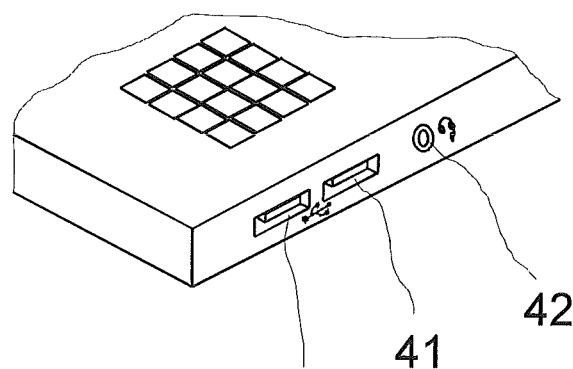
FIG. 2 is a perspective view of a part of the laptop computer.

FIG. 2 is a perspective view of a part of the laptop computer 4. The laptop computer 4 is a conventional laptop computer 4 with different ports, whereby external devices can be connected to the laptop computer 4. Thus, the shown part of the computer 4 comprises two USB ports 40, 41 and a headset port 42.

Figure 3:
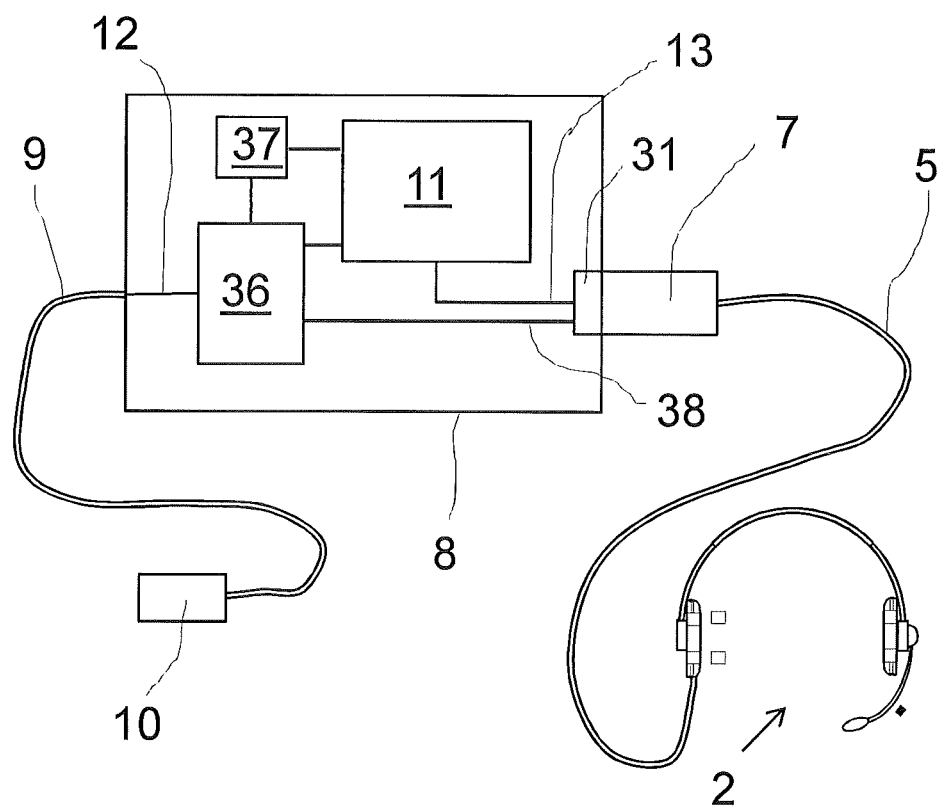
FIG. 3 is a detailed view of the external device, FIG. 4 discloses a schematic view of the connection between the external device and the headset where a first connecter wired to the headset is plugged into a second connector of the external device.

FIG. 3 is detailed view of an external device 8. The external device 8 comprises a controller 36, a user interface 37, and a combined DA/AD converter (digital-to-analogue and analogue-to-digital converter) 11 and the second connector 31. The USB cable 9 is having 4 poles, namely VBUS (+5 V), D−, D+ and ground. The USB cable 9 is connected to the controller 36. The controller 36 is connected to the user interface 37, the DA/AD converter 11 and the second connector 31. The connection 38 between the controller 38 and the second connector 31 comprises a pole with +5 V for supplying power to the headset 2 in order to power the ANC (active noise cancelling) circuit. The user interface 37 includes a button for answering and ending calls, a mute button for muting the microphone and volume buttons for adjusting the headset volume. The connection 31 between the DA/AD converter 11 the second connector 31 carries analogue signals from the DA/AD converter 11 to the two earphones and analogue signals from the microphone 29 to the DA/AD converter 11.

FIG. 4 discloses a schematic view of the connection between the external device 8 and the headset 2, where a first connecter 7 wired to the headset 2 is plugged into the second connector 31 of the external device 8. The first connector 7 is embodied as a standard 3.5 mm 4-conductor TRRS jack plug, which comprises a connector sleeve 32 and a connector rod 33. The connector rod 33 comprises a left audio contact area 14, a right audio contact area 15, a ground contact area 16 and a microphone contact area 17. The different contact areas are separated from each other by insulating material 43.

The second connector 31 comprises a standard 3.5 mm 4-conductor TRRS socket 39 (see FIG. 6), which TRRS socket 39 comprises a left audio contact pin 19, a right audio contact pin 20, a ground contact pin 21 and a microphone contact pin 22.

When the connector rod 33 of the first connector 7 is plugged into the socket 39 of the second connector 31, the left audio contact pin 19 is in electrical contact with the left audio contact area 14, the right audio contact pin 20 is in electrical contact with the right audio contact area 15, the ground contact pin 21 is in electrical contact with the ground contact area 16, and the microphone contact pin 22 is in electrical contact with the microphone contact area 17.

However, the connector sleeve 32 of the first connecter 7 comprises on its outside a power supply contact area 18 for supplying power to the headset 2 and the second connector 31 comprises a power supply contact pin 23, which contacts the power supply contact area 18, when the connector rod 33 of the first connector 7 is plugged into the TRRS socket 39 of the second connector 31. Thus, the ANC (active noise cancelling) circuit of the headset 2 receives power via the 5 conductor headset cord 5.

FIG. 5 is an end view of the first connector 7. The connector sleeve 32 is having two circular sides 44 and two flat sides 34, 35.

FIG. 6 is an end view of the external device 8. As shown, the second connector 31 of the external device 8 comprises a connector recess 30, a TRRS socket 39 and the five contact pins, where only the power supply contact pin 23 is shown in FIG. 6. The connector recess 30 is essentially rectangular, whereby the connector sleeve 32 only can fit in in two opposite positions. It does not matter which of the two possible positions is chosen as the power supply contact area 18 extends along the complete circumference and hereby also the two flat sides 34, 35 one of which the supply contact pin 23 will contact. However, a conventional connector sleeve with a circular cross section corresponding to the circular sides 44, will not fit into the connector recess 30 and will therefore not be compatible with the external device 8. In this way, unintended voltage supply to a metallic sleeve of a conventional TRRS connector is prevented. On the other hand, the TRRS plug 7 shown here is compatible with conventional TRRS sockets. Thus, the headset 2 may be used with a device comprising a conventional TRRS, although it will not receive power. Thus, the ANC may be switched off or driven by a battery while the headset 2 is connected to a conventional TRRS socket.

Figure 7:
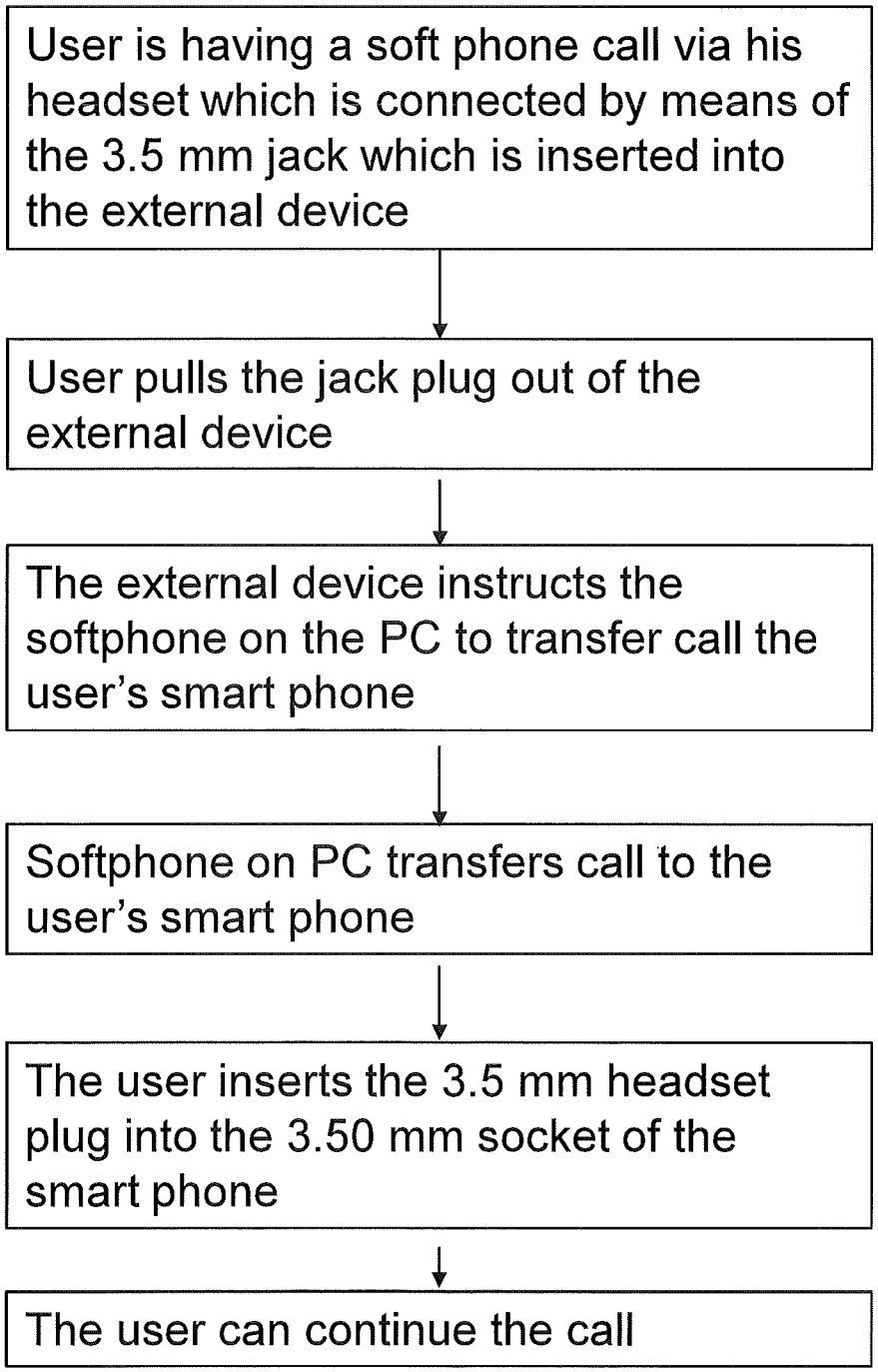
FIG. 7 is a flow chart showing the use of a headset system according to the invention, and FIG. 8 a diagram showing a headset system according to the invention.

FIG. 7 is a flow chart showing the use of the headset system 1 shown in FIG. 1.

Figure 8:
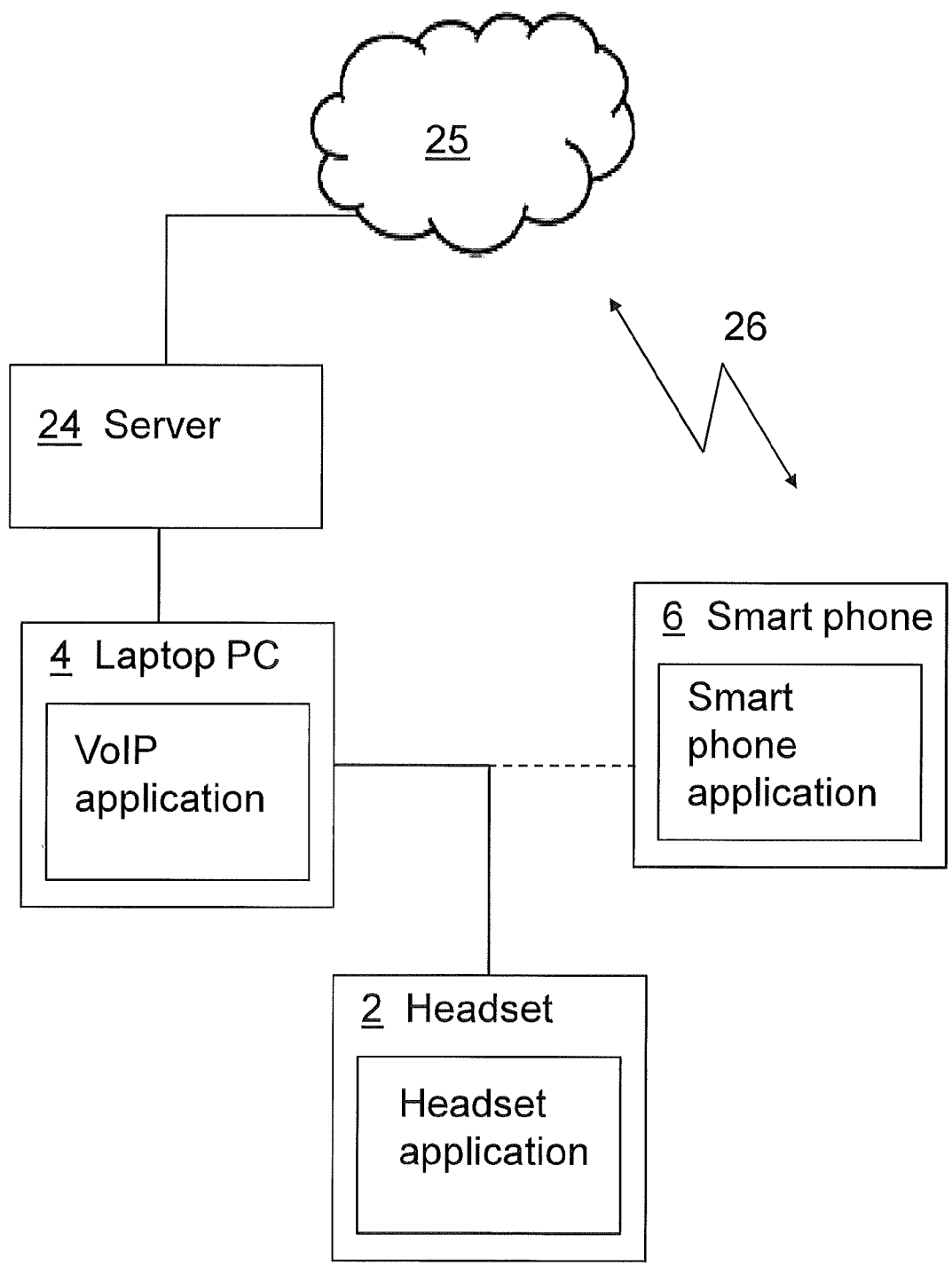

FIG. 8 is a more schematic view of the headset system 1 according to the second embodiment of the invention. In this embodiment, the headset cord is directly connected to the laptop PC 4. The laptop PC 4 is connected to a server 14. The server 14 could be installed in the same company as the laptop PC 4 or anywhere outside. The server 14 connects the PC 4 with the cloud 16, which includes the Internet, PSTN (Public Switched Telephone Network) and the mobile telephone network. A VoiP application such as Skype® or Microsoft Lync® is installed on the laptop PC 4. On the laptop PC 4 is also installed a softphone plugin forcing the VoIP application or the server 14 to transfer a call on the softphone to the smartphone 6, when the wired connection between the headset 2 and the laptop PC is interrupted. Software on the smart phone 6 recognises the transferred call and automatically accepts it. Audio messages or simple sounds may inform the other call participant that the call is transferred and will continue in a few seconds.

Only exemplary embodiments are shown here. Many other headset system embodiments may be contemplated. F. ex. the laptop could be replaced by a PSTN desk phone, IP Desk phone, desktop computer, tablet computer, smart phone or mobile phone.

Also, the smart phone 6 could be replaced by other portable telecommunication devices, such as a normal mobile phone or a tablet PC.

Also, the first embodiment could be embodied with a wireless connection between the external device 8 and the PC. Thus, a Bluetooth connection between the external device and the PC could be envisaged.

REFERENCE SIGNS 1 headset system
2 headset
3 first telecommunication device
4 laptop computer
5 headset cord
6 smart phone
7 jack plug (TRRS
8 USB sound card device
9 USB cord
10 USB connector
11 Audio processor
12 4 pole USB wiring
13 5 pole output wiring
14 tip of connector plug
15 first ring of connector plug
16 second ring of connector plug
17 sleeve of connector plug
18 charging contact of connector plug
19 first contact pin of connector receptable
20 second contact pin of connector receptable
21 third pin of connector receptable
22 fourth contact pin of connector receptable
23 charging contact pin of connector receptable
24 server
25 cloud
26 GSM link
27 user
28 microphone arm
29 microphone
30 connector recess
31 second connector
32 connector sleeve
33 connector rod
34 first flat side of connector sleeve
35 second flat side of connector sleeve
36 controller
37 user interface
38 power line
39 TRRS socket
40 USB port
41 USB port
42 headset port
43 insulating material
44 circular sides of connector sleeve

The invention claimed is:
1. A headset system comprising
a first telecommunication device comprising a desk phone or a computer with an installed softphone, said first telecommunication device having a first port,
a second telecommunication device,
a headset comprising a cord with a first connector is adapted to be interchangeably connected to the first telecommunication device and the second telecommunication device, includes a detector and interface capable of:
a. pre-programming the phone number of said second device to said first device so said first device will be able to transfer a call on the first device to the second device,
b. detecting the connection of said headset to said first port;
c. communicating the connection and then disconnection of said headset from said first port,
d. transferring a call currently on said first device to the second device, when the first connector is disconnected from the first telecommunication device.

2. A wireless headset system according claim 1, wherein the first telecommunication device comprises a main device, a laptop computer or a tablet computer, on which a softphone is installed.

3. A headset system according to claim 2, wherein the main device comprises a headset port or serial port, and wherein the softphone is adapted to transfer a call to the second telecommunication device, when the first connector is unplugged from the headset port or serial port.

4. A wireless headset system according to claim 2, wherein a softphone plug-in for performing a call transfer to a pre-programmed number of the second telecommunication device is installed on the main device, and eventually using a software API on the main device.

5. A headset system according to claim 1, wherein the first telecommunication device comprises an external device, which is connected to the main device, and wherein the external device comprises a second connector adapted to be connected to the first connector.

6. A headset system according to claim 5, wherein the external device comprises a third connector, by means of which it is connected to a port of the main device.

7. A headset system according to claim 5, wherein the external device comprises a controller and wherein the controller is adapted to send a call transfer control signal to the softphone, when the first connector is disconnected from the second connector.

8. A headset system according to claim 5, wherein the external device comprises a user interface, by means of which a user can control the first telecommunication device.

9. A headset system according to claim 5, wherein the port of the main device is a digital port, and wherein the external device comprises a digital-to-analogue converter and an analogue-to-digital converter.

10. A headset system according to claim 5, wherein the second connector comprises a standard 2.5 mm or 3.5 mm 4-conductor TRRS socket, which TRRS socket comprises a left audio contact pin, a right audio contact pin, a ground contact pin and a microphone contact pin, and wherein the first connector-comprises a corresponding 2.5 mm or 3.5 mm 4-conductor TRRS plug, which TRRS plug comprises a connector sleeve and a connector rod, which connector rod comprises a left audio contact area, a right audio contact area, a ground contact area and a microphone contact area.

11. A headset system according to claim 10, wherein the headset comprises power consuming electronics, and wherein the connector sleeve comprises a power supply contact area for supplying power to the headset and wherein the second connector comprises a power supply contact pin, which contacts the power supply contact area, when the TRRS plug of the first connector is plugged into the TRRS socket of the second connector.

12. A headset system comprising:
a first telecommunication device comprising a desk phone or a computer with an installed softphone having a first headset port,
a second wireless telecommunication device, having a second headset port,
a headset which is adapted to be interchangeably connected to the first telecommunication device and the second telecommunication device having a headset port,
wherein
the headset system includes a detector and interface capable of:
a. detecting the presence of said headset in said second port and
b. communicating the presence and then absence of said headset in said second port after removal of said headset from said second port;
c. detecting the subsequent presence of said headset in said first port,
d. transferring a call currently ongoing between the headset and said second device, and linking said headphone to said first port;
e. configuring said second device to automatically answer, without manual user intervention, said transferred call.

13. The system of claim 1 wherein said interface includes transmitting a voice message to said first device proximate the time when transferring the call.

14. The system of claim 12 wherein said interface includes transmitting a voice message to said first device proximate the time when transferring the call.

15. The system of claim 1 wherein said interface includes an analog to digital converter.

16. The system of claim 1 wherein said second device is configured to know a phone number ID of the first device so that it can automatically accept calls from the first device without manual user intervention.

17. A headset system according to claim 1, which is capable of configuring said second device to automatically answer, without manual user intervention.

18. A headset system according to claim 1, wherein the second wireless telecommunication device is having a second headset port.

* * * * *